Patented Jan. 2, 1945

2,366,526

UNITED STATES PATENT OFFICE 2,366,526

COMPOSITIONS OF MATTER AND METHODS AND STEPS OF MAKING AND USING THE SAME

William F. Schaufelberger, Orange, and Mortimer T. Harvey, East Orange, N. J., assignors, by direct and mesne assignments, to Harvel Research Corporation, a corporation of New Jersey No Drawing. Application December 21, 1940, Serial No. 371,212

4 Claims. (Cl. 202—52)

The present invention relates to methods of treating cottonseed oil to change its nature from that in which it has a non-drying characteristic to a state in which it has a drying characteristic and has a heavier body and higher viscosity than has the cottonseed oil before treatment by the method of the present invention, and the present invention further relates to the modified cottonseed oil after the treatment according to the present invention.

According to the present invention cottonseed oil is distilled at a reduced pressure to remove a substantial part of its weight as a distillate and to leave a residue. The distillate, for the most part is palmitic acid or palmitic acid anhydride or palmitolic acid or anhydride which are produced as a result of the destructive distillation of the glycerol palmitate, which latter is part of the natural content of cottonseed oil. The residue of this distillation method increases in viscosity as the period of distillation is increased, for any given distillation temperature and pressure, so that, as co-relevant facts, it can be stated that the greater the amount of glycerol palmitate removed the higher is the viscosity of the residue. And when about half of the glycerol palmitate has been removed by the method of the present invention the residue commences to assume a drying characteristic which is effective in the use of said residue as a drying oil in varnishes, paints, impregnations and molding compounds. The distillation can be carried on to a point where substantially all of the glycerol palmitate has been removed, which means distilling off between about twenty-five per cent and about thirty per cent of the total weight of the cottonseed oil which was the starting material. And at certain temperatures and pressures below atmospheric some of the other organic acid glycerides naturally occurring in cottonseed oil can come off and be destroyed to leave the corresponding organic acid or anhydride. And as high as fifty per cent of the original mass, by weight, of the cottonseed oil starting material can be distilled off by the method of the present invention to obtain various residues of desired predetermined viscosity and drying rates to serve various uses. The residues of the present invention have viscosities and drying characteristics not present in a mere mixture which represents the organic acid glycerides of cottonseed oil minus the glycerol palmitate naturally occurring therein. The effects of the method of the present invention in changing cottonseed oil from the non-drying condition to a drying condition begin to be apparent when the distillation pressure used is down to about 250 millimeters of mercury and the distillation temperature at this pressure can be between about 500° F. and 700° F., for example. Also distillation pressure lower than 250 mm. of mercury can be used and the distillation pressure can be as low as is practical with laboratory or commercial apparatus, that is, for example, as low as ten millimeters of mercury.

In the practice of the present invention either the crude cottonseed oil or the refined cottonseed oil of commerce can be used to obtain the prepared drying oils of the present invention.

An object of the present invention is to remove the palmitic acid glyceride constituent of cottonseed oil and to produce a thickened or bodied residue which has drying characteristics and other desirable characteristics not found in cottonseed oil.

Other objects and advantages of the present invention will be apparent from this specification and the accompanying claims forming part hereof.

The following are given as illustrative examples of the vacuum distillation of cottonseed oil according to the present invention, together with a description of the products obtained thereby.

*Example 1.*—Two hundred grams of raw cottonseed oil were heated at a pressure of about 25 millimeters of mercury, in a glass flask, connected to a jacketed condenser, until about fifty grams of the cottonseed oil was removed. The residue (one hundred and fifty grams) was dark and of rubbery consistency. The distillation condensate comprised a mass of white crystals, slightly yellowed by other material and indicated by its odor that it contained acryline compounds apparently produced by the destruction of the glycerine radicle of the decomposed, fatty acid glycerides. The white crystalline distillate was composed mainly of palmitic acid or palmitic acid anhydrides and weighed about forty-five grams. About five grams of the distillation products were lost, probably as lower decomposition products of glycerol. The jacket of the condenser was warmed to a point below 212° F. to keep the condensate from solidifying in the condenser.

*Example 2.*—Two hundred grams of refined cottonseed oil (known and bought as refined cottonseed oil on the open market) were heated in a glass container at a pressure of about 25 millimeters of mercury to about 650° F. until fifty-nine grams of the refined cottonseed oil has been removed through a condenser in the manner of Example 1. The distillation began at about 500°

F. Fifty-nine grams were removed as distillate. Forty-seven grams of distillation condensate were obtained and thus comprised a mass of white crystals. The distillation residue (one hundred and forty-one grams) was light colored and of very heavy body, and was free of odor of acrylic compounds.

Example 3.—One thousand grams of refined cottonseed oil were subjected to destructive distillation by being heated in a glass container at between about 600° F. and about 650° F. for four hours at about 25 millimeters of mercury in the manner of Example 1. The total weight removed from the refined cottonseed oil by this distillation was three hundred and ten grams and two hundred and eighty-three grams of distillation condensate were obtained as white crystals. The distillation residue (weighing six hundred and ninety grams) was of considerably heavier body than the starting material, carried no odor and showed no discoloration.

Example 4.—About one thousand grams of refined cottonseed oil were distilled from glass in the manner of Example 1, the heating being at between about 600° F. and 640° F. (most of the time at 620° F.) until two hundred and twenty grams of the starting material was removed. Two hundred and ten grams were obtained as distillation condensate which was a white crystalline solid. The distillation residue (seven hundred and eighty grams) was a light colored, bodied liquid of syrupy consistency and free of odor of acrylic compounds.

Example 5.—One thousand one hundred pounds of refined cottonseed oil (such as that described in Example 2) were loaded into a gas heated iron still and run at the temperatures and pressure as shown in the following time table:

| Time | Temperature, F. | Pressure in mm. of mercury |
|---|---|---|
| 5:00 a. m. | Gas lit | 100 |
| 8:30 a. m. | 500° | 100 |
| 9:00 a. m. | 545° | 100 |
| 9:20 a. m. | 581° gas off | 100 |
| 9:35 a. m. | 600° | 100 |
| 9:45 a. m. | 617° | 100 |
| 10:00 a. m. | 608° gas relit | 100 |
| 10:30 a. m. | 608° | 100 |
| 10:55 a. m. | 600° | 100 |
| 11:15 a. m. | 590° | 100 |
| 11:25 a. m. | 590° | 100 |
| 11:45 a. m. | 590° | 100 |
| 12:15 p. m. | 590° | 100 |
| 1:15 p. m. | 590° | 100 |
| 2:00 p. m. | 600° | 100 |
| 2:30 p. m. | 590° gas off, residue sample drawn | 100 |
| 3:00 p. m. | 590° sample drawn | 100 |
| 3:30 p. m. | Drew residue and distillate | |

The viscosity of the residue sample drawn at 2:30 p. m. was 3856 centipoises, the viscosity of the 3:00 p. m. residue sample was 4640 C. P., and the viscosity of a sample of the residue as drawn at 3:30 p. m. was 5280 C. P. After the drawn residue had stood some time the viscosity reached 6380 C. P. at which it remained constant. The viscosity of the refined cottonseed oil used as starting material was 62 C. P. All these viscosities were taken at 77° F. (25° C.) with a given "Armour" pipette made by the Bloomfield Scientific Glass Company of Bloomfield, New Jersey. Other characteristics of the refined cottonseed oil starting material are as follows: saponification number 199.9 (average of four samples from 192.3 to 206.2; acid number, milligrams of KOH, 0.096; specific gravity, 0.9204.

The viscosities taken were checked by the Gardner-Holt method and corresponded thereto, except that the "Armour" method for the present purpose is considered to be more accurate. The factor for the "Armour" pipette used was 6.2.

The yield of the distillation residue was eight hundred and fifty-one pounds with fifteen pounds additional removed in taking samples and the amount of distillation condensate was one hundred and forty pounds. Part of the apparent loss of ninety-four pounds comprised material caught in a trap on the still and on the inside surface of the apparatus.

The still was flooded with carbon dioxide gas before breaking the vacuum to avoid ignition on contact with air and the distillation residue was cooled and then drawn out of the still.

Twenty-five millimeters of mercury is given as an example (in the above Examples 1 to 4) of the reduced pressure at which the destructive distillation process of the present invention is carried on and in Example 5 about one hundred millimeters of mercury is given as an operative pressure but higher pressures and lower pressures can be used down to any point, for example, to any point below 25 mm. and as low as ten millimeters or two millimeters of mercury, according to the apparatus available and suitable for operation on a commercial scale. It is found that the time of distillation, at a given temperature and to a given amount of removal of distillate decreases as the pressure is decreased, and that the distillation residue thickens (gets a heavier body) in a shorter time and has a lighter color as the pressure is decreased. And the temperature, length of time and heating, and reduction of pressure can be predetermined to obtain a predetermined body ranging from 1500 cp. viscosity, for example, to a rubbery state, as in Example 1, either with raw cottonseed oil or refined cottonseed oil. With the above reduced pressures given as examples, it can be stated that an operative reduced pressure is one under which the cottonseed oil can be heated to effect the destructive distillation of the glycerol palmitate constituent of cottonseed oil to produce palmitic acid and anhydrides thereof and at the same time effect a bodying of the distillation residue, that is, to effect a bodying of the unsaturated fatty acid glyceride constituents of cottonseed oil. And the term "cottonseed oil" as used in the claims hereof is intended to cover both raw cottonseed oil and the refined cottonseed oil known and obtainable on the market.

In each of the examples, as in Example 1, it is considered that the distillate not recovered as condensate is lost in the form of lower decomposition products of the glycerol radical that is removed. It can be seen, however, that in some cases this loss is quite low and might be within the limit of error.

Having thus described our invention, what we claim and desire to protect by Letters Patent is:

1. The method which comprises distilling cottonseed oil at a temperature between about 500° F. and about 700° F. and at a reduced pressure ranging downwardly from about 250 millimeters of mercury until the quantity by weight of the distillate removed therefrom measures between about 15% to about 50% of the original mass by weight.

2. The method which comprises distilling cottonseed oil at a temperature between about 600° F. and about 650° F. and at a reduced pressure ranging downwardly from about 250 millimeters of mercury until the quantity by weight of the distillate removed therefrom measures between about 15% to about 50% of the original mass by weight.

3. The residue obtained by distilling cottonseed oil at a temperature between about 500° F. and 700° F. and a reduced pressured ranging downwardly from about 250 millimeters of mercury until the quantity by weight of the distillate measures between about 15% to about 50% of the original mass by weight.

4. The residue obtained by distilling cottonseed oil at a temperature between about 600° F. and 650° F. and a reduced pressure ranging downwardly from about 250 millimeters of mercury until the quantity by weight of the distillate measures between about 15% to about 50% of the original mass by weight.

WILLIAM F. SCHAUFELBERGER.
MORTIMER T. HARVEY.